United States Patent

Roos

[11] 3,910,810
[45] Oct. 7, 1975

[54] MACHINE FOR CONTINUALLY WORKING A WEB, PARTICULARLY BY WELDING AND SEVERING

[75] Inventor: Dirk Godfried Johannes Roos, Amsterdam, Netherlands

[73] Assignee: Windmoller & Holscher, Lengerich of Westphalia, Germany

[22] Filed: Dec. 27, 1973

[21] Appl. No.: 428,680

[30] Foreign Application Priority Data
Dec. 28, 1972 Germany.................. 2263885

[52] U.S. Cl. .............. 156/510; 53/180 M; 93/33 H; 93/DIG. 1; 156/515; 156/583
[51] Int. Cl.² ......................................... B32B 31/18
[58] Field of Search .......... 156/510, 582, 515, 583, 156/543, 251, 553, 252; 83/325, 326; 93/33 H, 8 R, DIG. 1, 35 R; 53/180 M; 104/66, 172 S, 252, 172 R, 172 C; 219/243

[56] References Cited
UNITED STATES PATENTS

| | | | |
|---|---|---|---|
| 2,738,631 | 3/1956 | Jarund | 93/DIG. 1 |
| 3,147,168 | 9/1964 | Bateman | 156/583 |
| 3,314,376 | 4/1967 | Lerch et al. | 104/252 |

*Primary Examiner*—Douglas J. Drummond
*Assistant Examiner*—J. Gall Agner
*Attorney, Agent, or Firm*—Fleit & Jacobson

[57] ABSTRACT

An apparatus is disclosed for working a two-ply web such as welding and severing thermoplastic tubing along transverse lines during the manufacture of bags. A plurality of tool carriers moves with the web through a working station. The tool carriers consist of pairs of individual carriers disposed in groups on opposite sides of the working station. Each group revolves in an endless path through the working station and back. Endless coupling belts or chains travel adjacent to the web within the working station in the plane in which the web is worked upon. Clamping faces provided on the individual carriers clamp the coupling belts or chains between opposing carriers within the working station and thus transport the tool carriers through the working station.

Each group of individual carriers is provided with endless return chains on opposite sides of the working station. The chains are driven in synchronism with the tool introducing mechanism and generally follow the paths of revolution of the individual carriers. The chains carry protruding cams which engage the individual carriers during the return portion of the cycle.

A pair of catching chains is provided for each group of individual carriers on opposite sides of the working station. The catching chains follow the paths of revolution of the individual carriers during the initial portion of the return course and move at a lower velocity than the return chains. The catching chains couple with the individual carriers to prevent relative movement between the chains and the carriers.

8 Claims, 1 Drawing Figure

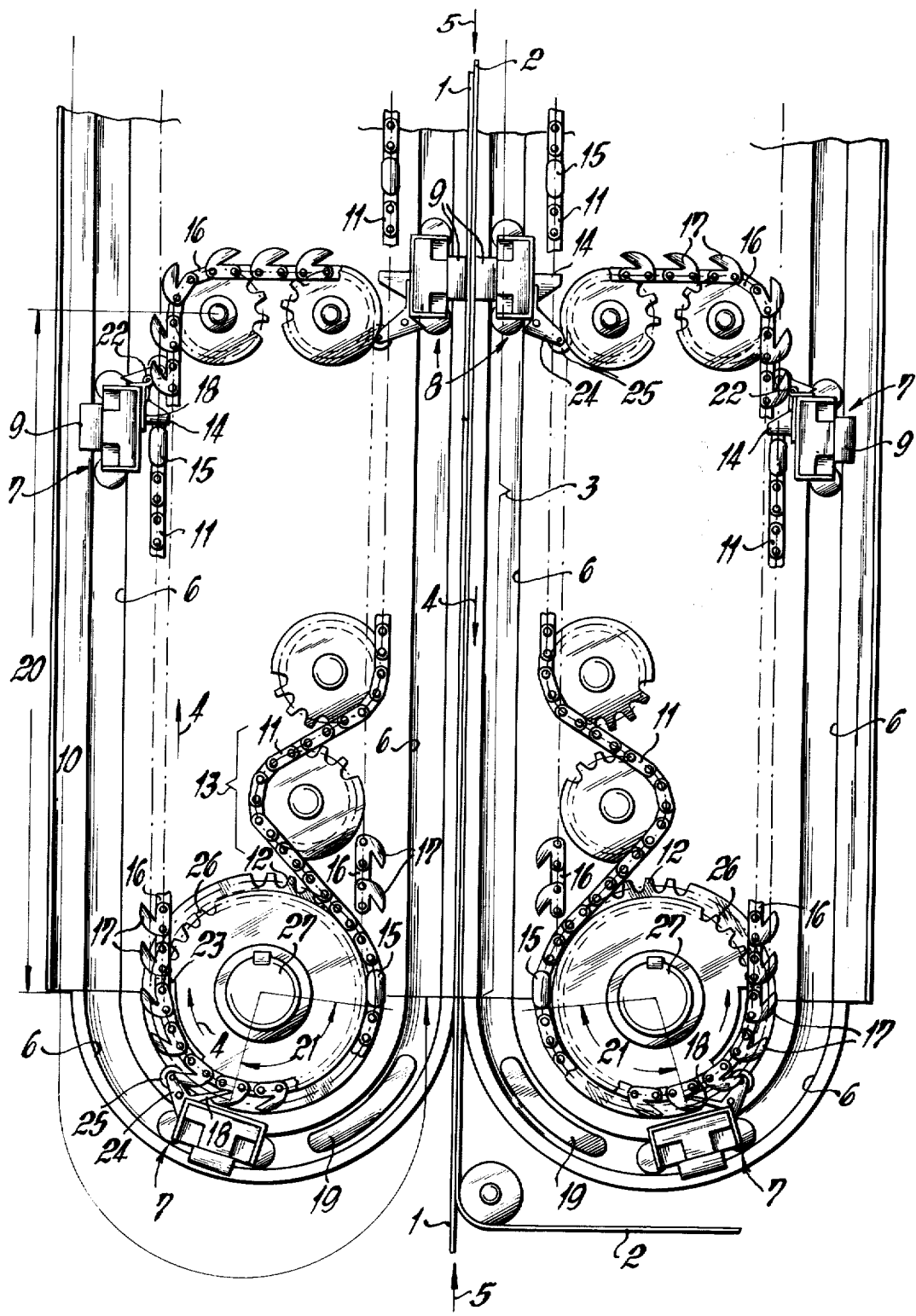

MACHINE FOR CONTINUALLY WORKING A WEB, PARTICULARLY BY WELDING AND SEVERING

BACKGROUND

This invention relates to a machine for working on a two-ply web, particularly on thermoplastic tubing. The machine operates preferably by welding and severing, at transverse lines having a predetermined longitudinal spacing, during the manufacture of bags. The machine comprises a plurality of tool carriers, which extend transversely to the longitudinal direction of the web and together with the web are movable in a plane through a working station and consist of pairs of individual carriers, which are disposed on opposite sides of the working station. The individual carriers form groups, which are disposed on opposite sides of the working station and are caused to revolve in endless paths past the working station and back. The carriers are also adapted to be advanced by drive means and in adjustable regular intervals are adapted to be introduced into the working station simultaneously in pairs by respective introducing means. The introducing means are each independently controlled. The apparatus further comprises two endless coupling belts or chains which extend on opposite lateral sides of the working station. Each of the belts has a course which extends in said plane in which the web is worked upon. Cooperating clamping faces, which are formed at both ends of the individual carriers and during the introduction of two individual carriers into the working station clamp the coupling belts or chains between them and thus carry the tool carrier along through the working station. The apparatus also comprises for each group of individual carriers on both sides of the working station respective pairs of endless return chains. The return chains are adapted to be driven in synchronism with the introducing means and at least outside the working station (return path) follow the paths of revolution and carry regularly spaced, protruding flight cams, which engage the individual carriers from below. The two pairs of return chains are driven at the same velocity with the flight cams and are in phase synchronism with the cams so that a simulteneous transfer of two individual carriers from respective groups to the introducing means is ensured, particularly according to German Pat. No. 2,104,082.

In this machine, the individual carriers of the several pairs of tool carriers are guided by respective pairs of oval rails along vertically extending, endless oval paths on respective sides of the working station. In the working station, the individual carriers are combined in a pair of tool carriers and are moved downwardly, in the direction of the force of gravity and at the same velocity as the web by coupling belts. Along the ascending course, the carriers are moved by return chains at a return velocity which usually differs from the velocity of the web. The two straight portions of the oval track are joined by semicircular U-shaped portions of the track rails. In the arcadelike upper reversing bends of the track rails, each individual carrier is moved by two wheels, which cause the individual carriers to be introduced simultaneously into the working station. In the festoon-like lower reversing bends, the individual carriers are left to themselves when they have been released by the coupling belt and are moved there only under the action of their own weight virtually in a free fall. In the lower reversing bend, the individual carriers are engaged by the flight cams of the return chains and are subsequently returned along the ascending return course to the beginning of the working station.

This manner of returning the individual carriers and of transferring them from the coupling belt to the return chain has the disadvantage that the free fall of the individual carriers in the lower reversing bends results in an intermediate acceleration. A further disadvantage is that each individual carrier is delayed for some time until it is engaged by the next flight cam of the return chain. During this delay, the individual carrier swings back and forth at least once in the lower reversing bend. The duration of the delay depends on the speed of operation of the machine and on the longitudinal spacing of the points where the web is to be engaged by the tools. Depending on circumstances, the descending flight cam entering the lower reversing bend may strike on the cam-engageable surface of the swinging individual carrier at a dead center or during a swinging movement or opposite to the direction of movement of the flight cam. The tendency of the individual carriers to swing in the lower reversing bends also depends on the resistance to rolling of the guide rollers which are secured to the individual carriers and engage the track rails. Some individual carriers soon came to a standstill. Whereas the transfer may incidentally take place when a favorable combination exists, in most cases the flight cams of the return chain engage the surface of the individual carriers at a time when there is a high relative velocity between the flicht cam and the carrier surface so that the flight cam strikes said surface very hard. This striking imposes limits on the speed of the machine because the higher the machine speed the higher is the return speed as well as the relative velocity between the flight cams and the cam-engageable surfaces and also the striking force. Unless the life of the machine, specifically of the means for returning the individual carriers, is to be intolerably shortened, the striking force must be limited so as to avoid an excessive wear and breakage.

It is an object of the invention to eliminate this disadvantage and to enable an increase of the speed of the machine without an increase of the force with which the flight cams strike the cam-engageable surfaces of the individual carriers. This object is accomplished according to the invention in that the machine defined first hereinbefore comprises for each group of individual carriers on each lateral side of the working station a pair of catching chains for the individual carriers. The catching chains follow the course of the paths of revolution at least approximately along the first half of the return course, and are driven to move in the same direction but at a lower speed than the return chains. The individual carriers and/or the catching chains are also provided with one-way coupling means which prevent a relative movement between the individual carrier and the receiving chain opposite to the direction of revolution.

The catching chains provided according to the invention always catch the individual carriers when they move at the velocity at which the catching chains revolve. In the vertical arrangement in which the individual carriers move in the direction of the force of gravity through the working station the individual carriers are initially accelerated by their free fall in the descending portion of the lower reversing bend. At the lowermost point of the free fall, the carriers reach a maximum velocity. The individual carriers are retarded without shock in the ascending portion of the lower reversing bend in a natural manner as a result of the ascent of the track rails. Independently of the machine speed, the length of the working section, or the tendency of the individual carrier to swing, each individual carrier moves at some time and at some point of its movement along the ascending portion of the lower reversing bend at the same velocity as the catching chain. At this very time, the catching chains catch the individual carrier with means which prevent a relative movement opposite to the direction of revolution. The catching chains take the individual carrier along the return course of the oval path of revolution in the direction of revolution until a flight cam of the return chain has caught up with the individual carrier. The relative velocity between the flight cam and the cam-engageable surface and with it the striking force, is now restricted to the difference in velocity between the return chain and the catching chain. This difference can be controlled and is readily tolerable.

The invention is particularly intended for use in the machine covered by the patent mentioned hereinbefore. In that machine, the web moves upwardly through the vertical working station. Because the provision of the catching chains according to the invention prevents a decrease of the velocity at which the individual carriers revolve below the velocity of these catching chains, the present invention is not restricted to such machine but is also applicable to similar machines in which the web moves downwardly through a vertical working station. The invention is also applicable to a machine in which the working station is inclined. In machines having an inclined working station it makes no difference whether the carriers ascend or descend through the working station and whether they descend or ascend along the return courses. A lead of the individual carriers along the return course under the action of gravity and a movement in synchronization with the return chains may be prevented or ensured in that the individual carriers are subjected to a braking force.

The relative velocity between the return chain and the catching chain is preferably selected to amount to 5–30 percent of the velocity at which the return chain revolves. A low relative velocity will be selected mainly in machines operating at high speed and/or when the sections between the points to be worked upon are long. The absolute value of the relative velocity should be less than about 1 meter per second. This absolute value is inversely proportional to the weight of the individual carrier and of the tool secured thereto, i.e., to the masses which are to be accelerated by the flight cams as they strike on the cam-engageable surface of the individual carrier. If these masses are large, the absolute value of the relative velocity must be small; if they are small (light-weight design), a higher absolute value will be permissible.

The relative velocity between the return chains and the catching chains can be controlled in that each chain is driven by a separate shaft and the latter is coupled to a drive which is individually controlled in speed. Alternatively, a transmission which is variable in speed infinitely or by the use of change gears may be connected between two shafts used to drive the return chains and catching chains, respectively, if one of these shafts is coupled to a drive shaft or to the main drive means of the machine. These two alternatives afford the advantage that an optimum relative velocity can be adjusted. When bags are to be made in a size which always agrees to the spacing of the flight cams, it will be sufficient if the percentage of the difference in velocity is very small and the lower striking force exerted by the overtaking return chains permits of high production speeds. When bags are to be made in a size which greatly differs from the spacing of the flight cams, the percentage of the difference in velocity must be very large so that the striking forc exerted by the overtaking flight cams is very strong and permits only of an opperation at low speed.

To permit of a low difference in velocity, the path for overtaking must be as long as possible and the lead of the individual carrier relative to the associated flight cam at the beginning of the path for overtaking must be as small as possible. To avoid an undue increase of this lead, braking forces are exerted on the individual carriers at least in the first half of those reversing bends which succeed the working station. The individual carriers moved by the coupling belts out of the working station are retarded by these braking forces to, but not below, the velocity at which the catching chains revolve. In this way an unnecessarily large lead of the individual carriers relative to the catching chains and the flight cams which are still behind the individual carriers is avoided.

If, as mentioned above, each pair of chains are driven by a separate drive shaft, the chains in spite of revolving at different velocities may be trained around chain sprockets having the same radius, which is approximately as large as the radius of the lower reversing bend so that the path for overtaking includes not only the straight portion of the return course but also the lower reversing bend and as a result is particularly long. With such long path for overtaking, the relative velocity may be somewhat lower in percent and the absolute speed of operation may be increased.

It will be understood that the above-mentioned provision for an adjustment of the difference in velocity involves a higher structural expenditure, which may not be required in some cases where such adjustment is less important. Alternatively, a drive may be imparted to the chains in that the pairs of return chains and the pairs of catching chains associated with a group of individual carriers are driven by the same shaft and chain-driving sprockets which differ in diameter and the ratio between these diameters is the same as the desired velocity ratio. In this way the percentage of the difference in velocity is fixed and only the absolute value of said difference can then be varied by a change of the speed of operation. On the other hand, the machine is much simplified.

The one-way coupling means which prevent a return movement of a carrier relative to the catching chain suitably consist of hooks carried by the catching chains. The hooks may be distributed throughout the periphery of the chains and open in the direction of revolution. Locking pawls carried by the individual carriers and facing opposite to the direction of revolution are arranged to fall into the hooks. A slipping of the locking pawls on and into the hooks would give rise to an unnecessary wear and noise. To avoid such slipping, each locking pawl may be held in an inoperative position by a returning force and may be temporarily moved to an operative position adjacent to the lower return bends of the paths of revolution. For this purpose, e.g., each locking pawl may be provided with a lever. A cam for cooperation with the levers may be provided adjacent to the lower return bends and serves to turn the locking pawl to its operative position.

The invention will be explained more fully hereinafter with reference to an embodiment shown by way of example on the drawing, which shows the lower portion of the working station travelled through by the revolving tools and their reversing loop provided with the catching chains according to the invention.

The working machine itself is fully described in the German Pat. specification 2,104,082, and reference thereto is made herein as regards details of the machine and its general mode of operation. A similar machine having a horizontal working station is described in the Opened German specification 1,479,627. At this junction it is only briefly stated that the web 1 to be worked is moved at the same velocity as coupling belt 2 in the direction of the force of gravity (direction of arrow 4) through a working station 3 in a vertical plane 5. Groups of individual carriers 7 are disposed on opposite sides of the working station and movable along endless oval paths of revolution 6 defined by rails. The coupling belts 2 carry successive individual carriers 7 of respective ones of these groups through the introducing means, not shown, and into the working station 3, in which the individual carriers are combined to form composite tools 8 disposed on both sides of the working station. For this purpose, the individual tool carriers 7 clamp the coupling belt 2 between registering clamping members 9 carried by the individual carriers 7. Only the two facing straight courses of the two paths of revolution 6 define the working station 3. Those straight courses of the paths of revolution which face away from each other and the U-shaped reversing bends form the return course 10. Return chains 11 are provided, which follow the oval paths of revolution 6 and by the chain sprocket 12 are driven at a velocity which is lower than the velocity at which the web is worked upon. Only adjacent to the working station 3 are the return chains 11 deflected from a straight line in respective V-shaped loops 13 to permit of a tensioning of the chains. The individual carriers 7 are provided on their rear faces, which face into the oval, with noselike hooks 14, which are engaged from below by flight cams 15 carried by the return chains.

At the lower end of the working station, where the parallel straight portions of the paths of revolution merge into the lower reversing bends and the paths diverge, the individual carriers for the composite tools 8 are separated and the clamping is discontinued. The individual tool carriers 7 are now left to themselves and under their own weight fall into the festoon-shaped U-bend so that their velocity is even increased.

To avoid a stoppage of swinging of the individual carrier 7 in the reversing loop before the individual carrier is engaged by the cam flights 15, catching chains 16 are provided according to the invention. At least in the first portion of the return course, which portion directly succeeds the working station the chains 16, follow the course of the oval path of revolution 6 and are driven in the same direction of revolution as the return chains but at a somewhat lower velocity. Just as the return chains 11, these catching chains 16 are provided in pairs on both lateral sides of the machine for each group of individual carriers 7. Throughout their length, they are provided with hooks 17. The hooks are forwardly open and block opposite to the direction of revolution. On its rear side, facing the catching chain, each individual carrier has a locking pawl 18. Each pawl engages barb hooks 17 of the catching chains 16 and prevents a relative movement between the catching chain 16 and the individual carrier 7 opposite to the direction of revolution 4 at least to an extent which exceeds the hook spacing. When the individual carrier 7 falls into the lower reversing bend, it may assume a higher velocity than the catching chain 16 or the return chain 11 because the carrier is accelerated by its own weight notwithstanding the means for preventing a rearward movement of the individual carrier. Because the carrier 7 is naturally retarded in the ascending portion of the festoonlike lower U-shaped bend and the means 17/18 preventing a rearward movement of the carrier are provided, the velocity of the carrier cannot decrease below the velocity at which the catching chains 16 revolve. When the individual carrier moves at the same speed as the catching chains, the locking pawl 18 of the individual carrier falls into the barb hooks 17 of the catching chain 16 and is carried along by the latter without a shock. To avoid an otherwise unnecessary lead as a result of the acceleration by gravity and to ensure that the individual carriers 7 leaving the working station 3 begin to be retarded from the working velocity to the velocity of revolution as soon as the coupling belt 2 and the web 1 to be worked upon have been released, braking forces may be exerted on the individual carriers, e.g., by braking jaws 19, which are disposed in the rails defining the path of revolution 6 and extend through an aperture in the rail and are forced into contact with the individual carrier through the rail. The catching chain and the return chain extend parallel one beside the other in the straight ascending portion of the return course. In this portion, which succeeds the lower reversing bend, a flight cam 15 of the return chain 11 must catch up with the individual carrier 7. The smaller the difference in velocity between the catching chain and return chain (such a small difference is inherently desired to ensure that the transfer shock will be slight), the longer will be the path which is required for overtaking. The path 20 for overtaking must not extend beyond the entrance into the arcuate upper U-shaped loop, where the individual carriers are transferred by the return chain to the introducing means. In case of an early artificial braking, the lead 21 of the individual carrier 7 relative to the associated flight cam 15 catching up is smaller than when the individual carrier is not braked to the velocity of the catching chain until the carrier has reached the ascending portion of the U-shaped bend and said braking is effected by gravity. For a given length of the path for overtaking and for a given absolute difference in velocity, a smaller lead enables the selection of a higher speed of operation.

To prevent a slipping of the locking pawl 18 over the barb hooks and the resulting noise and wear, the locking pawl 18 is held by spring force (spring 22) in an inoperative position. Only in the region in which the locking pawl is intended to fall (in the ascending portion of the lower U-shaped bend when there is no artificial braking) is the locking pawl moved to its operative position by a fixed cam 23 provided in said region and a cam follower roller 25, which is connected by a short lever 24 to each locking pawl 18.

The spring force is so small that once the locking pawl has fallen into the hook the spring force cannot turn the locking pawl out of the barb hook even when the cam follower is not urged to its operative position. Only when the flight cams 15 overtake an individual carrier 7 and lift it out of the barb hooks 17 of the catching chains can the spring 22 turn the locking pawl 18 to its inoperative position.

The catching chains 16 are driven by the same shaft 27 as the return chain 11. Because the catching chains 16 are trained around a chain sprocket 26 which is smaller in diameter than the chain sprocket 12 for the return chain 11, the drive sprocket 26 revolves at a lower peripheral velocity and drives the chain 16 at a lower velocity. The ratio between the diameters of the drive sprockets 12 and 26 determines also the ratio of the velocities of revolution. Obviously, both drive sprockets 12 and 26 could be driven from separate drive means which are variable in speed. This would have the advantage that the optimum difference in velocity could be adjusted.

It is emphasized that the present invention is not restricted to the machine described in the German Pat. specification 2,104,082, which has a vertical working station through which the tools move downwardly, but may be applied also to similar machines having a working station through which the tools move upwardly, or to machines having a horizontal or inclined working station.

What is claimed is:

1. A machine for working on a two-ply web, particularly on thermoplastic tubing, preferably by welding and severing, at transverse lines having a predetermined longitudinal spacing, during the manufacture of bags, comprising a plurality of tool carriers, which extend transversely to the longitudinal direction of the web and together with the web are movable in a plane through a working station and consist of pairs of individual carriers, which are disposed on opposite sides of the working station, the individual carriers forming groups, which are disposed on opposite sides of the working station and caused to revolve in endless paths past the working station and back and are adapted to be advanced by drive means and in adjustable regular intervals are adapted to be introduced into the working station simultaneously in pairs by respecitive introducing means, which are independently controlled, which apparatus further comprises two endless coupling belts or chains which extend on opposite lateral sides of the working station and each of which has a course which extends in said plane in which the web is worked upon, and cooperating clamping faces, which are formed at both ends of the individual carriers and during the introduction of two individual carriers into the working station clamp the coupling belts or chains between them and thus carry the tool carrier along through the working station, which apparatus also comprises for each group of individual carriers on both sides of the working station respective pairs of endless return chains, which are adapted to be driven in synchronism with the introducing means and at least outside the working station follow the paths of revolution and carry regularly spaced, protruding flight cams, which engage the individual carriers from below, the two pairs of return chains being driven at the same velocity and with the flight cams in phase synchronism so that a simultaneous transfer of two individual carriers from respective groups to the introducing menas is ensured, characterized in that the machine defined first hereinbefore comprises for each group of individual carriers on each lateral side of the working station a pair of catching chains for the individual carriers, which catching chains follow the course of the paths of revolution at least approximately along the first half of the return course, and are driven to move in the same direction but at a lower speed than the return chains, and that the individual carriers and the catching chains are provided with one-way coupling means which prevent a relative movement between the individual carrier and the receiving chain opposite to the direction of revolution.

2. A machine according to claim 1, characterized in that the relative velocity between the catching chains and the return chains is up to about 30 percent of the velocity of the return chains but less than about 1 meter per second.

3. A machine according to claim 1, characterized in that the pairs of return chains and the pairs of catching chains associated with a group of individual carriers are driven by the same shaft and chain-driving sprockets which differ in diameter and the ratio between these diameters is the same as the desired velocity ratio.

4. A machine according to claim 1 characterized by hooks carried by the catching chains and distributed throughout the periphery thereof and open in the direction of revolution, and locking pawls carried by the individual carriers and facing opposite to the direction of revolution and arranged to fall into the hooks.

5. A machine according to claim 4, characterized in that each locking pawl includes a means for holding said locking pawl in an inoperative position and for temporarily moving said locking pawl to an operative position adjacent to the lower return bends of the paths of revolution.

6. A machine according to claim 4, characterized in that each locking pawl is provided with a lever, and a cam for cooperation with the levers is provided adjacent to the lower return bends and serves to turn the locking pawl to its operative position.

7. A machine according to claim 1, further including braking means which exert braking forces on the individual carriers positioned in at least the first half of reversing bands which succeed the working station.

8. A machine according to claim 1, characterized in that the return chains and the catching chains are trained around chain sprockets equal in diameter adjacent to that return bend which succeeds the working station.

* * * * *